United States Patent [19]

Nagasawa et al.

[11] B  4,015,020

[45] Mar. 29, 1977

[54] TARTAR REMOVAL BY ELECTRODIALYSIS AND POTASSIUM LEVEL CONTROL IN WINE

[75] Inventors: Taro Nagasawa; Mamoru Tomita; Yoshitaka Tamura, all of Tokyo; Teruhiko Mizota, Fuchi, all of Japan

[73] Assignee: Morinaga Milk Industry Co., Ltd., Tokyo, Japan

[22] Filed: Apr. 29, 1975

[21] Appl. No.: 572,726

[44] Published under the second Trial Voluntary Protest Program on February 24, 1976 as document No. B 572,726.

[52] U.S. Cl. .......................... 426/239; 204/180 P; 426/271; 426/524; 426/592; 426/493; 210/22 C; 426/15

[51] Int. Cl.² .......................................... A27D 6/00

[58] Field of Search ............... 204/180 P; 426/239, 426/11, 15, 271, 592, 493, 524, 330; 210/22; 426/15

[56] References Cited

UNITED STATES PATENTS

| | | | |
|---|---|---|---|
| 2,754,212 | 7/1956 | Wiseman | 426/271 |
| 3,369,906 | 2/1968 | Chen | 204/180 P |
| 3,437,491 | 4/1969 | Peterson | 426/271 |
| 3,865,960 | 2/1975 | Wucherpfennig | 426/239 |
| 3,865,961 | 2/1975 | Wucherpfennig | 426/239 |

*Primary Examiner*—Norman Yudkoff
*Assistant Examiner*—Hiram H. Bernstein
*Attorney, Agent, or Firm*—Oblon, Fisher, Spivak, McClelland & Maier

[57] ABSTRACT

A method of treating wine, comprising introducing crude wine to both the dilution and concentration chambers of an electrodialysis apparatus; operating said apparatus so that the potassium concentration of the wine in the dilution chamber falls to below 500 mg/liter and the potassium content of the wine in the concentration chamber is increased into the range 1000 to 2000 mg/liters; cooling the wine from the concentration chamber to below 10° C and adding tartaric acid crystals to said wine in order to adjust the pH into the range of 2.8 to 3.2 thereby precipitating tartar; separating the tartar from the wine and admixing said wine with wine emerging from the dilution chamber of the electrodialysis apparatus in a ratio such that the potassium content of the resulting mixture is below 500 mg/liter.

10 Claims, 1 Drawing Figure

TARTAR REMOVAL BY ELECTRODIALYSIS AND POTASSIUM LEVEL CONTROL IN WINE

BACKGROUND OF THE INVENTION

1. Field of the Invention

The present invention relates to a process for refining a crude wine. More particularly, it relates to a process for preparing a refined wine in which tartar precipitate is not formed during storage.

2. Description of the Prior Art

In recent years, the consumption of and demand for wine have greatly increased.

However, conventional and traditional methods are still employed in the preparation of wine, i.e., modernization and the introduction of new concepts has been relatively slow. The major reason for this trend is that even a minor modification of the process can cause significant deterioration of color, tone, taste, aroma and cloudiness due to tartar formation, all of which are very important for the quality of wine. On the other hand, the increased demand for wine makes new processes capable of producing good, cheap wines very attractive.

Therefore, if a wine could be supplied cheaply in large quantities without a concomitant deterioration it its quality by improving and conceptualizing in a modern way the techniques of wine making, a very desirable advance in the art would be obtained.

In the preparation of wine, the fermentation process is undoubtedly the decisive factor in the resultant quality of the wine. However, the prevention of the formation of dregs such as tartar during fermentation or during curing after the completion of fermentation is also an extremely important factor in the production of wine as a saleable commodity.

The conventional process for refining wine may be summarized as follows:

When fermentation is completed the wine (hereinafter referred to as "crude wine") is racked off, or separated from the lees or sediment. Racking may be repeated several times at intervals, the crude wine being stored in wooden cooperages where aging takes place. The crude wine is then cleared before bottling. Fining agents such as isinglass, gelatin or bentonite clay are used, assisted by processes such as heat treatment, refrigeration and filtration. When a refined wine is bottled young, a special chilling to remove excess tartar is necessary. Even so, the wine frequently produces a slight deposit when aged in the bottle for several years. The refined wine, which has been processed through dreg-separation and subsequent aging, is bottled and marketed as a commodity. Thus, the conventional process for refining wine has an enormous disadvantage in that it is laborious and time-consuming since repeated dreg separation is required. Furthermore, in the conventional method for refining wine, it is very difficult to control the amount of tartar that is precipitated during the aging process so that tartar often precipitates from the wine after bottling.

Recently, a process for refining wine comprising promoting the precipitation of tartar by chilling a crude wine to −4°C to 5°C using a cooling device (Journal of the Japan Brewing Association, 63, 951 (1968) and a process for refining wine by repeated alternative cooling and heating have been developed. However, these refining processes have similar disadvantages to the conventional processes, because dreg separation must be frequently conducted. In principle, it is necessary to completely remove tartar from a crude wine before bottling. Thus, the removal and precipitation of tartar should be controllable at will and easily performable in wine manufacturing. Nevertheless, the procedures which conventionally have been employed or those which are suggested in publications are invariably dependent upon the process of separating tartar by storing crude wine in a barrel for a long period or by cooling crude wine. Essentially, the need for an effective process for tartar removal from wine remains unfulfilled.

The treatment of wine by electrodialysis using an ion-exchange membrane in order to remove acids and ions therefrom has been reported (Bulletin of the Research Institute of Fermentation, Yamanashi University, Japan, No. 6, pp. 1 to 6, 1959). The process described in this article involves placing wine into the center chamber of an ion-exchange membrane electrodialysis apparatus having electrode chambers containing 0.02% salt solutions on both sides and applying direct current between both electrodes to effect ion migration from the wine into the 0.02% solution of salt. (See FIG. 6 on page 2 of the above-cited reference.) According to this report, the flavor of the wine was not adversely affected after the electrodialysis while pH elevation, lowering of the titration acidity and decrease of calcium, magnesium, iron and copper content were observed. This process, however, is burdened with several significant defects:

1. The flavoring components are simultaneously removed during tartar removal and the flavor of the wine worsens;
2. In view of the mechanism of the electrodialysis apparatus and the principle of electrodialysis, mixing of water or the salt solution into the wine is inevitable; and
3. the pH of the wine rises remarkably and the color tone of the wine is changed.

Therefore, simple application of an ion-exchange membrane electrodialysis to a crude wine for partial removal of tartar-forming components results in appreciable deterioration in the flavor and in other inherent indispensible qualities of the wine.

From the foregoing discussion, it is obvious that it would be most desirable to have a process for simple removal of tartar in wine without affecting the flavor and other inherent properties of the refined wine.

SUMMARY OF THE INVENTION

Accordingly, it is the object of this invention to provide an industrial process for continuous removal of tartar from wine which is characterized by selective removal of tartar from crude wine without causing a decrease or removal of other flavoring components, a change of pH, or migration of other solutions or components into the wine.

Briefly, this and other objects of the invention, as will be hereinafter made clear by the ensuing discussions, have been attained by providing a treatment for wine which comprises introducing wine to both the dilution and concentration chambers of an electrodialysis apparatus, operating said apparatus so that the potassium concentration of the wine in the dilution chamber falls to below 500 mg/liter and the potassium content of the wine in the concentration chamber is increased into the range 1000 to 2000 mg/liter, cooling the wine in the concentration chamber to below 10°C and adding tartaric acid crystals to adjust its pH into the range 2.8 to 3.2 in order to precipitate tartar, separating the tartar from the wine and admixing said wine with wine emerging from the dilution chamber of the electrodialysis apparatus in a proportion such that the potassium content of the resulting mixture is below 500 mg/liter, preferably below 400 mg/liter. Preferably, the process is carried out on a continuous basis.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein:

The FIGURE is a flow chart showing a process for refining crude wine according to the present invention.

DETAILED DESCRIPTION OF THE PREFERRED EMBODIMENTS

Figure 1:
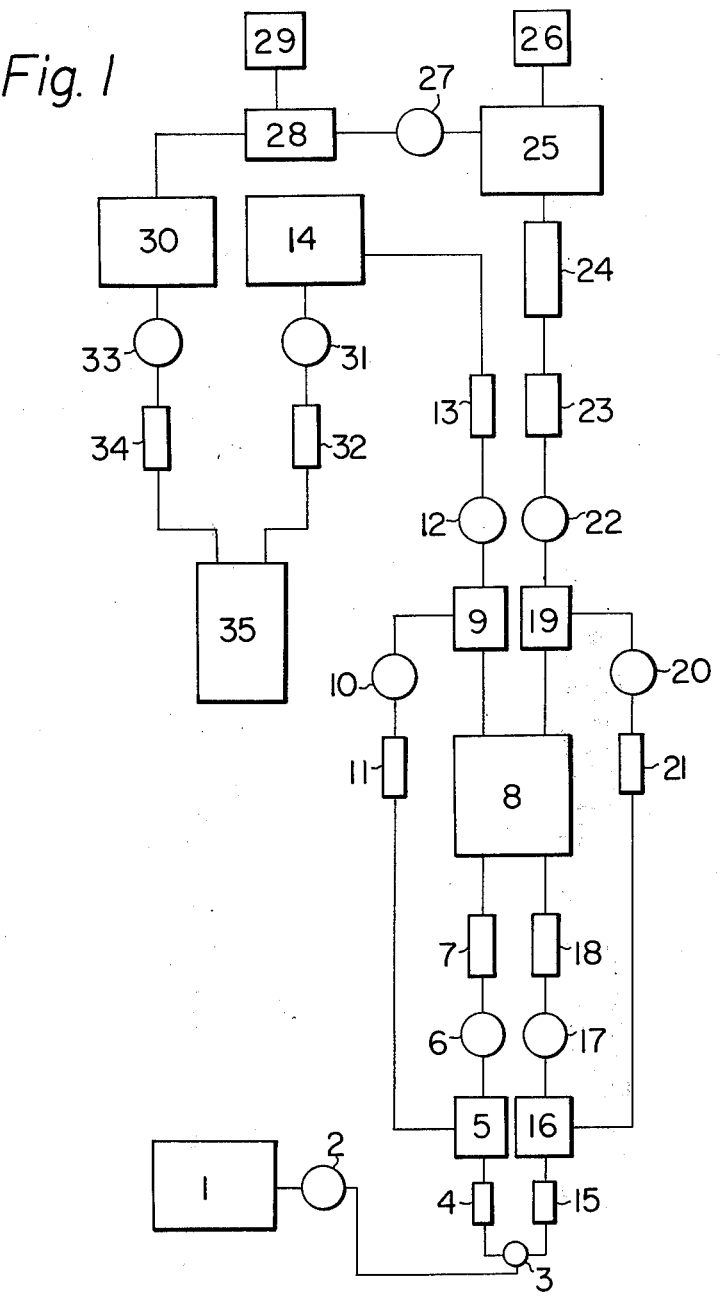

The process depicted in FIG. 1 is performed as follows.

A portion of crude wine is conveyed to a balance tank 5 for deionized wine from a crude wine storage tank 1 through a two-way tube 3 by a pump 2 while controlling the flow rate by a flow meter 4. It is then supplied from the balance tank 5 through a pump 6 and a flow meter 7 to the diluting chamber of the electrodialysis apparatus 8 and continuously deionized while being circulated. Part of the deionized wine it then returned to the balance tank 5 through an overflow tank 9, the pump 10 and flow meter 11 while another part of the deionized wine is stored in deionized wine storage tank 14 through pump 12 and flow meter 13. Concurrently, another portion of crude wine is conveyed to balance tank 16 for concentrated wine through the pump 2, two-way tube 3 and flow meter 15. It is then supplied from the balance tank 16 through pump 17 and flow meter 18 to the concentrating chamber of the electrodialysis apparatus 8 and is continuously recirculated. Thus, the salts removed from the wine in the diluting chamber migrate into the wine in the concentrating chamber, thereby causing the salt concentration in the wine in the concentrating chamber to increase. Part of the wine whose salt concentration is increased is returned to the balance tank 16 via an overflow tank 19 through pump 20 and flow meter 21 while another portion of this wine is conveyed to cooler 24 for chilling through pump 22 and flow meter 23. It is stored in a tartar-crystallizing tank 25 into which a small amount of crystal tartaric acid is introduced from a storage tank 26. This wine, which has been subjected to induced precipitate formation by exposure to tartar crystal, is sent to a filter 28 by pump 27, whereby tartar is removed and sent to a tartar storage tank 29. After removal of these crystals, the wine from the outlet of the concentrating chamber is stored in tank 30. Finally, the streams of deionized wine from the storage tank 14 and that from the storage tank 30 are combined in a predetermined ratio by pumps 31 and 33 and flow meters 32 and 34, respectively. The product is stored in refined wine storage tank 35.

Each step of the present process will now be explained in detail.

1. Deionization of Crude Wine

The wine which is subjected to refining in the present invention is crude wine which is obtained by primary fermentation of grape juice and contains more than 6% of alcohol and usually 700 to 1000 mg/l of potassium. In the progress of fermentation and subsequent aging of the crude wine, the potassium associates with the tartaric acid which is contained in crude wine, thereby crystallizing and precipitating as tartar. Therefore, the formation of a tartar precipitate after fermentation can be prevented by a deionizing treatment of the crude wine thereby reducing the content of either or both the potassium and tartaric acid to a level below a critical value.

According to the experiments performed using the present process, when the potassium content in crude wine is reduced to below 500 mg/l, desirably below 400 mg/l, no tartar precipitate is formed in the subsequent processing steps or after bottling. That is, formation of a tartar precipitate in wine can be prevented by removing about 40 to 70% of the potassium content from crude wine.

2. Electrodialysis By Means of Permselective Membrane

Any commercially available electrodialysis apparatus using an ion-permselective membrane can be employed. In the present invention, the stream of crude wine is divided into two streams. One stream is passed through the diluting chamber of the ion permselective membrane electrodialysis apparatus and the other is passed through the concentrating chamber of the same apparatus, whereby ions, mainly potassium and chlorine, pass from the diluting chamber to the concentrating chamber. The ions separated from the crude wine in the diluting chamber (hereinafter referred to as "deionized wine") are passed into the crude wine flowing through the concentrating chamber (hereinafter referred to as "concentrated wine"). The deionized wine is repeatedly circulated through the diluting chamber until the potassium content is lowered to below 500 mg/l; the concentrated wine is repeatedly circulated through the concentrating chamber until the potassium content rises to 1000 to 2000 mg/l. In order to prevent impairment of the ion permselective membrane and deterioration of the flavor of the crude wine, the electrodialyzing temperature should desirably be below 50°C. However, the temperature should preferably be higher than 10°C, particularly 20° to 25°C, in order to prevent the precipitation of tartar from the concentrated wine during the electrodialysis. Although the potassium content of the concentrated wine varies depending on the operating conditions of the electrodialysis apparatus, it should be lower than 2000 mg/l which is equivalent to the critical concentration for formation of a tartar precipitate in the dialysis apparatus and should be higher than 100 mg/l from the viewpoint of economy and ease of operation. The particularly preferred range is 1400 to 1600 mg/l.

The ratio of the flow rate of deionized wine and concentrated wine after division by the two-way tube 3 in FIG. 1 should be 1.5 : 1.0 to 3.0 : 1.0. The optimum ratio is 2.0 to 2.5 : 1.0. As shown in FIG. 1, the deionized and the concentrated wine should circulate in the electrodialysis apparatus for the period of time which is required for achievement of potassium deionizing and concentrating to the predetermined extents in each chamber, respectively. When the desired potassium contents are reached, both wines migrate from the overflow tanks 9 and 19, respectively, under influence of the pumps 12 and 22, respectively, to the next respective operation steps. Simultaneously, the same amount of crude wine, corresponding to the amount of deionized and concentrated wine being moved by the pumps 12 and 22, is respectively supplied to the balance tanks 5 and 16 through the two-way tube 3 by adjusting the flow rate by the flow meters 4 and 15, respectively. That is, after the predetermined values of the potassium contents of the deionized and concentrated wines are achieved, the amounts of wine which are returned to the balance tanks 5 and 16 by the pumps 10 and 20 are decreased by the same amounts as are pumped through flow meters 13 and 23. But the amount of crude wine which is equivalent to the total decreased fraction in each loop is supplied to the respective balance tanks by the pump 2. The amount of crude wine supplied varies depending upon the capability of the electrodialysis apparatus and the sizes of the reduction in the potassium content in the deionized wine and the increase in the concentration of the potassium in the concentrated wine.

3. Deionized Wine

This procedure enables the reduction of the potassium concentration of the deionized wine but simultaneously causes deterioration in flavor because not only potassium but also chlorine, amino acids and other components migrate to the concentrated wine in the electrodialysis apparatus. Therefore, this desalted wine per se is not commercially acceptable in flavor, i.e., as common wine or champagne. Consequently, in the present invention, the deionized wine is stored and, thereafter, is mixed with the concentrated wine in the same proportion in which the crude wine is initially divided. As described below, the ratio of deionized wine to the concentrated wine is adjusted to restore after mixing the same flavor that original wine possessed.

4. Concentrated Wine

In the concentrated wine, as described above, not only is potassium concentrated to within the range of 1000 to 2000 mg/l, but also the concentrations of components such as chlorine, amino acid, and others are affected.

The principle in this invention is to obviate formation of tartar precipitates by mixing the concentrated wine, which has been subjected to preferential removal of potassium by cooling with the desalted wine, which was prepared by the above procedure, in the same ratio as that between the initial two flows of the crude wine. The preferential removal of potassium from the concentrated wine is achieved by chilling it to lower than 10°C and adding crystalline tartaric acid thereto, resulting in precipitate formation and separation of potassium as tartar.

The pH of the concentrated wine rises by 0.1 to 0.3 after the deionizing operation due to the increase in concentration of potassium and other salts. The pH is then adjusted to the same value as the original crude wine or to a pH less by an amount of 0.1 to 0.2 pH unit by adding crystalline tartaric acid. Formation of the tartar precipitate is effected by addition of tartaric acid and the lowering of the temperature of the concentrated wine to below 10°C. The potassium content in the concentrated wine after removing this tartar precipitate is about 700 mg/l.

The results of an experiment performed on refining a crude white wine after the completion of the main fermentation, are as follows (Table 1):

TABLE 1

Properties and Compositions of Crude White Wine, the Deionized Wine and the Concentrated Wine

| item | Crude white wine | Deionized wine | Concentrated wine |
|---|---|---|---|
| pH | 3.20 | 3.20 | 3.40 |
| Potassium, mg/l | 840 | 410 | 1687 |
| Alcohol Vol. % | 8.79 | 8.76 | 8.77 |
| Tartaric acid, g/l | 2.45 | 1.85 | 3.64 |
| Acetaldehyde, mg/l | 70 | 40 | 130 |
| Ash, g/l | 2.08 | 1.30 | 3.40 |

In this experiment, an electrodialysis apparatus was employed, using an ion permoselective membrane Type SV-III, which was manufactured by Asahi Chemical Industries, Limited, according to the specifications shown in Table 5 below. A crude white wine having the properties and composition as shown in Table 1, Column 2, was subjected to electrodialysis under the deionizing conditions shown in Table 6 below. Twenty liters of the wine passed through the desalting chamber of the apparatus and 10 l of the wine passed through the concentrating chamber. pH was determined by the conventional method using a pH meter, and the potassium and alcohol contents were determined by atomic absorption spectroscopy (See, for example, "Atomic Absorption Spectroscopy" by Tsugio Takeuchi and Masami Suguki, 1st Ed., Nankodo, 1969) and the buoy method (see, for example, Note of Analysis in the Tax Administration Agency, page 14, March, 1973), respectively. The tartaric acid content was calculated from an alkali titration of the total acids content (see, for example, the same note, page 57), and the acetaldehyde content and ash content were determined by the A.O.A.C. (see, for example, the same note, page 36), and ashing methods, respectively. Next, crystal tartaric acid was added to the concentrated wine, and the wine was divided into seven portions. Each portion of the concentrated wine was adjusted to a pH from 3.4 to 2.8 in graduations of 0.1, i.e., one had a pH of 3.4, another of 3.3, etc. Each was then cooled to about 3°C, allowed to stand for about 12 hours, and filtered to remove the tartar precipitate. The pH, potassium content and tartaric acid content of the filtrates were determined by the methods mentioned above. The results are shown in Table 2. Note that the pH of the concentrated wine may be adjusted either after or before cooling.

TABLE 2 pH and Potassium and Tartaric Acid Contents of the Concentrated Wine After Filtration of Tartar

| Test No. | pH | Potassium content in mg/l | Tartaric acid content in g/l |
|---|---|---|---|
| 1 | 3.40 | 890 | 2.00 |
| 2 | 3.30 | 774 | 2.80 |
| 3 | 3.20 | 670 | 3.55 |
| 4 | 3.10 | 510 | 4.65 |
| 5 | 3.00 | 433 | 5.75 |
| 6 | 2.90 | 368 | 6.50 |
| 7 | 2.80 | 302 | 7.60 |

From these results, it is evident that the potassium content in the concentrated wine was reduced to about one-third of its original level by the precipitate formation and removal of tartar when the pH was adjusted to from 3.00 to 3.20.

5. Mixing of the Deionized and the Concentrated Wine

The deionized wine in Table 1, Column 3 and the concentrated wine in Table 2, Test No. 3, were mixed in a ratio equal to the initial dividing ratio of crude wine before electrodialysis; that is, 2 l of the desalted wine and 1 l of the concentrated wine were mixed, and the pH, potassium and tartaric acid content of the resulting 3 l of refined wine were determined. The results are shown in Table 3.

TABLE 3

| item | Properties and Compositions of the Deionized, Concentrated and Refined Wines | | |
|---|---|---|---|
| | Deionized wine | Concentrated wine | Refined wine |
| pH | 3.20 | 3.20 | 3.20 |
| Potassium,mg/l | 410 | 670 | 499 |
| Tartaric acid,g/l | 1.85 | 3.55 | 2.42 |

Both wines may be mixed in the various ratios, within the range in which the flavor is not greatly impaired. However, in any case, if the potassium content in the mixed wine is below 500 mg/l, the formation of tartar is not observed in the subsequent processing steps and during storage after bottling.

An experiment was performed to test the possibility of utilizing a direct process for prevention of tartar formation in wine which is characterized by direct addition of tartaric acid to a crude wine in order to lower the pH value, chilling to below 4°C and filtering out the resultant tartar. However, this method was not satisfactory because of the unacceptable flavor of the product. This occurs because the pH must be lowered to below 2.80 in order to decrease the potassium content in the wine to below 500 mg/l. Therefore, the product obtained has a pH which is too low and the final concentration of tartaric acid is elevated to 6.0 g/l (equivalent to 2.5 times the tartaric acid content in ordinary wine).

It is concluded, therefore, that a wine or champagne which possesses good flavor and does not cause tartar formation can be prepared by preferential removal of a portion of the potassium and tartaric acid contents from crude wine according to the process of the present invention. This preferential removal of the two species of ions is achieved by preparing a deionized and a concentrated wine using an electrodialysis apparatus employing an ion permselective membrane, adding tartaric acid to the concentrated wine in order to crystallize excess potassium as tartar followed by removal of the tartar by filtration, mixing the concentrated wine with the deionized wine in a predetermined ratio. The present invention can be similarly applied to the fermented liquors from fruits other than grapes which are similar to grape wine in composition and in the nature of the formation of tartar precipitates. When employed herein, the term "wine" should be construed as extending to such fermented liquors.

The superior effects achieved by the process of the present invention, include the following:

1. The flavor of crude wine remains undeteriorated since any possibility of the migration of water, salts and other materials into the deionized wine is excluded due to the circulation of the crude wine in both the deionizing and concentrating systems.

2. The potassium contents in both the deionized and the concentrated wine can be easily adjusted at will. Therefore, the potassium content of the wine suitable for its use as a commodity can be adjusted to a suitable predetermined value within a short time.

3. The potassium content can be easily reduced or adjusted by removing potassium in the concentrated wine as tartar by the addition of crystals of tartaric acid thereto.

4. Tartar can be selectively removed without deteriorating the flavor of the crude wine since preferential removal of any desired concentrations of potassium and/or tartaric acid from the crude wine is possible with no change in the concentration of other components of the crude wine. This performance is achieved by a process in which the deionized wine and the concentrated wine, which has been subjected to tartar removal, are mixed in essentially the same ratio as that by which the crude wine was divided at the initial inlet of the electrodialysis apparatus.

5. The process of the present invention is economical since the required tartaric acid can be recovered from the removed tartar product, and can be reused.

Having generally described the invention, a more complete understanding can be obtained by reference to certain specific examples, which are included for purposes of illustration only and are not intended to be limiting unless otherwise specified.

EXAMPLE 1

Twenty liters and 10 l of crude white wine having completed its main fermentation and having the properties and composition shown in Table 4 were supplied to the diluting and concentrating chambers, respectively, of an electrodialysis apparatus using an ion permselective membrane (Type SV-III) made by Asahi Chemical Industries, Limited, the latter having the specifications shown in Table 5. The conditions shown in Table 6 were employed in the process. The wine was circulated for a length of time sufficient to adjust the potassium contents of the wine to about 400 mg/l and about 1900 mg/l in the deionizing and concentrating systems, respectively. The properties and composition of the deionized wine and the concentrated wine after the deionizing treatment are shown in Table 7. Measurement of the pH and quantitative analysis of each component were conducted in the same manner as described above.

TABLE 4

| Properties and Composition of Crude White Wine. | |
|---|---|
| Alcohol, Vol. % | 9.04 |
| Tartaric acid, g/l | 2.48 |
| pH | 3.25 |
| Ash, g/l | 2.32 |
| Potassium, mg/l | 905.0 |
| Acetaldehyde, mg/l | 71.0 |

TABLE 5

| Specification of Type SV-III Ion Exchange Membrane Electrodialysis Apparatus Made by Asahi Chemical Industries, Limited. | |
|---|---|
| Ion exchange membrane | |
|    Cation exchange membrane | K-101 |
|    Anion exchange membrane | A-201 |
| Effective area of membrane per chamber | 288 cm$^2$ |
| Spacing between membranes (thickness of gasket) | 0.75 m/m |
| Number in desalting chamber | 30 |
| Number in concentrating chamber | 31 |

TABLE 6

Condition for Deionizing Treatment

| | |
|---|---|
| Temperature | 20°C ± 2°C |
| Linear velocity | |
|   Diluting chamber | 12 cm/sec (26 l/min) |
|   Concentrating chamber | 10 cm/sec (21.6 l/min) |
| DC current value | |
|   Start of operation | 2 A |
|   End of operation | 1 A |
| Voltage | 50 V ± 2 V |
| Operation time | 35 minutes |

TABLE 7

Properties and Composition of the Deionized and Concentrated Wines After Deionizing Treatment of the Crude White Wine

| item | Deionized wine | Concentrated wine |
|---|---|---|
| Alcohol, Vol. % | 9.02 | 9.03 |
| Tartaric acid, g/l | 1.80 | 3.82 |
| pH | 3.20 | 3.42 |
| Ash, g/l | 1.49 | 4.00 |
| Potassium mg/l | 398 | 1905 |
| Acetaldehyde, mg/l | 69 | 71 |

Crystalline tartaric acid was added to 10 l of the concentrated wine to adjust the pH to 3.20. It was then cooled to 4 – 5°C and allowed to stand for 12 hours, and filtered to remove the tartar produced during cooling. Two liters of the deionized wine described in Table 7, Column 2, were mixed with 1 l of the concentrated wine from which the tartar had been removed. The properties and composition of the 3 l of refined wine obtained are shown in Table 8. The refined wine obtained was bottled by conventional methods and post-fermented to produce a product. Even after storage for a long period of time, no precipitation of tartar was found in the product. The product had good flavor. Thus, there was no deficiency in quality.

TABLE 8

Properties and Composition of the Deionized, Concentrated and Refined Wines.

| item | Deionized wine | Concentrated wine | Refined wine |
|---|---|---|---|
| pH | 3.20 | 3.20 | 3.20 |
| Potassium, mg/l | 398 | 653 | 480 |
| Tartaric acid, g/l | 1.80 | 3.44 | 2.34 |
| Acetaldehyde, g/l | 69 | 71 | 70 |
| Alcohol, Vol. % | 9.02 | 9.03 | 9.02 |
| Ash, g/l | 1.49 | 2.04 | 1.67 |

EXAMPLE 2

Twenty liters and 10 l of a crude red wine having the properties and composition as shown in Table 9 and having completed the main fermentation were supplied to the diluting and concentrating chambers, respectively, of the same electrodialysis apparatus as used in Example 1. The same deionizing conditions as were employed in Example 1 were used. The wine was circulated for a sufficient length of time to adjust the potassium contents to about 450 mg/l and about 1700 mg/l in the desalting and concentrating systems, respectively.

TABLE 9

Properties and Composition of Crude Red Wine.

| | |
|---|---|
| Alcohol, Vol. % | 8.83 |
| Tartaric acid, g/l | 2.39 |
| pH | 3.27 |
| Ash, g/l | 2.26 |
| Potassium, mg/l | 870 |
| Acetaldehyde, mg/l | 57 |

The properties and composition of the deionized and concentrated wines after deionizing treatment are shown in Table 10. Measurement of pH and quantitative analysis of each component were performed by the same methods as used in the above test.

TABLE 10

Properties and Composition of the Deionized and Concentrated Wines After Deionizing of the Crude Red Wine.

| item | Deionized wine | Concentrated wine |
|---|---|---|
| Alcohol, Vol. % | 8.77 | 8.82 |
| Tartaric acid, g/l | 1.91 | 4.37 |
| pH | 3.21 | 3.42 |
| Ash, g/l | 1.39 | 3.97 |
| Potassium, mg/l | 462 | 1691 |
| Acetaldehyde, mg/l | 55 | 59 |

Crystalline tartaric acid was added to 5 l of the concentrated wine to adjust the pH to 3.10. The wine was then cooled to 4° – 5°C, allowed to stand for 12 hours, and filtered to remove the tartar precipitate produced during cooling. Two liters of the deionized wine described in Table 10, Column 2 were mixed with 1 l of the concentrated wine from which tartar had been removed. The properties and composition of the 3 l of refined wine obtained are shown in Table 11. The refined wine was bottled by the usual technique and aged to produce a product. Even after storage for a long period of time, no precipitation of tartar was found in the product. The product had good flavor. Thus, there was no deficiency in quality.

TABLE 11

Properties and Composition of the Deionized, Concentrated and Refined Wines.

| item | Deionized wine | Concentrated wine | Refined wine |
|---|---|---|---|
| pH | 3.21 | 3.10 | 3.18 |
| Potassium, mg/l | 462 | 502 | 474 |
| Tartaric acid, g/l | 1.91 | 3.67 | 2.50 |
| Acetaldehyde, mg/l | 55 | 57 | 56 |
| Alcohol, Vol. % | 8.77 | 8.84 | 8.79 |
| Ash, g/l | 1.39 | 1.88 | 1.55 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of treating wine, which comprises: introducing crude wine to both the dilution and concentration chambers of an electrodialysis apparatus; operating said apparatus so that the potassium concentration of the wine in the dilution chamber falls to below 500 mg/liter and the potassium content of the wine in the concentration chamber is increased into the range 1000 to 2000 mg/liter; cooling the wine from the concentration chamber to below 10°C and adding tartaric acid crystals to said wine in order to adjust the pH into the range 2.8 to 3.2 thereby precipitating tartar; separating the tartar from the wine and admixing said wine with wine emerging from the dilution chamber of the electrodialysis apparatus in a ratio such that the potassium content of the resulting mixture is below 500 mg/liter.

2. The method of claim 1, wherein the process is carried out continuously.

3. The method of claim 2, wherein the wine in the concentration chamber is subjected to continuous circulation.

4. The method of claim 1, wherein the electrodialysis is carried out at a temperature below 50°C.

5. The method of claim 4, wherein the electrodialysis is carried out at a temperature in the range 20° to 25°C.

6. The method of claim 1, wherein the concentration of potassium in the wine in the concentration chamber of the electrodialysis apparatus is raised to a level from 1400 to 1600 mg/l.

7. The method of claim 1, wherein the potassium content of the fluid product is below 400 mg/l.

8. The method of claim 1, wherein the wine from the concentration chamber, having had tartar removed therefrom, is mixed with wine from the dilution chamber in a ratio equal to that by which the crude wine was divided initially when passing into the concentration and dilution chambers.

9. The wine produced by the treatment of claim 1.

10. The wine of claim 9, having a potassium content of less than 500 mg/l.

* * * * *